Patented Sept. 4, 1928.

1,682,934

UNITED STATES PATENT OFFICE.

LINWOOD T. RICHARDSON, OF NEW BRUNSWICK, NEW JERSEY, ASSIGNOR TO THE CUTLER-HAMMER MFG. CO., OF MILWAUKEE, WISCONSIN, A CORPORATION OF WISCONSIN.

SYNTHETIC RESIN AND METHOD OF PRODUCING THE SAME.

No Drawing.   Application filed May 15, 1922. Serial No. 561,008.

This invention relates to synthetic resins and methods of producing the same.

An object of the invention is that of providing novel commercial resin adapted to various uses.

Another object is that of providing for production of such resin in a facile, expeditious and inexpensive manner from materials which are readily obtainable at moderate cost.

Such resin is a reaction product of furfural and certain inorganic reagents, such product being adapted to numerous and varied uses industrially and commercially, including uses similar or analogous to those to which well known natural and synthetic resins are now applied.

In the production of this resin the aforementioned organic and inorganic agents are brought into intimate contact, as by slow addition of one to the other, and maintained in such intimate relation during the ensuing reaction which proceeds automatically in most cases, it being desirable in certain instances to assist or control the reaction as by thermic influence or otherwise.

As exemplary of the methods which may be adopted for production of the resin, the following is selected:

Ten parts commercial furfural and two parts concentrated sulphuric acid are brought together and thoroughly mixed, whereupon reaction takes place spontaneously with production of a gelatinous substance capable of transformation either automatically or otherwise to a state of hardness. The resultant product is characterized by brilliant natural superficial finish and shininess of fracture exposed surfaces indicating density of structure and substantial absence of porosity.

While the foregoing specific example mentions only sulphuric acid, it is to be understood that many other inorganic substances have been found to be capable of reaction singly or otherwise with furfural for formation of similarly useful products by similar or analogous methods. Among such other substances may be mentioned phosphoric acid, hydrochloric acid, bromine, and halogen derivatives of elements of the sulphur type including mono and poly-halides of sulphur and sulphuryl chloride.

What I claim as new and desire to secure by Letters Patent is:

1. An industrially useful hard resin which is the reaction product of furfural and an inorganic substance of acid reaction or character adapted to produce resinification of the furfural.

2. An article of manufacture comprising a hard resin which is the reaction product of furfural treated with an inorganic acid material.

3. As an article of manufacture, a hard resin which is the reaction product of furfural acidified by sulphuric acid.

4. The process of producing an industrially useful hard resin from furfural and inorganic substance of acid reaction or character adapted to produce resinification of the furfural, which consists in bringing such substances into intimate contact and maintaining such contact until resinification takes place.

5. The process of producing an industrially useful hard resin from furfural and sulphuric acid, which consists in bringing such compounds into intimate contact and maintaining such contact during continuance of the reaction which ensues.

6. An industrially useful hard resin which is the product of reaction between ten parts of furfural and about two parts of concentrated sulphuric acid.

In witness whereof, I have hereunto subscribed my name.

LINWOOD T. RICHARDSON.